(12) United States Patent
Hashimoto et al.

(10) Patent No.: US 7,157,395 B2
(45) Date of Patent: Jan. 2, 2007

(54) CRUCIBLE FOR MELTING RARE EARTH ELEMENT ALLOY AND RARE EARTH ELEMENT ALLOY

(75) Inventors: Takahiro Hashimoto, Takefu (JP); Fukuji Matsumoto, Takefu (JP); Takehisa Minowa, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/495,452

(22) PCT Filed: Nov. 14, 2002

(86) PCT No.: PCT/JP02/11873

§ 371 (c)(1),
(2), (4) Date: May 13, 2004

(87) PCT Pub. No.: WO03/042617

PCT Pub. Date: May 22, 2003

(65) Prior Publication Data

US 2005/0016635 A1      Jan. 27, 2005

(30) Foreign Application Priority Data

Nov. 16, 2001 (JP) ............................. 2001-351583
Nov. 16, 2001 (JP) ............................. 2001-351584

(51) Int. Cl.
*C04B 35/478* (2006.01)
*C04B 35/50* (2006.01)

(52) U.S. Cl. ................ 501/134; 501/152; 501/127; 148/302; 266/280

(58) Field of Classification Search ................ 501/152, 501/153, 127, 134; 148/302; 266/280
See application file for complete search history.

(56) References Cited

U.S. PATENT DOCUMENTS

| | | | | |
|---|---|---|---|---|
| 3,825,653 A | * | 7/1974 | Duerksen ................... 423/598 |
| 3,890,140 A | * | 6/1975 | Asbury ........................ 75/398 |
| 4,966,875 A | * | 10/1990 | Micheli et al. ............. 501/152 |
| 5,409,871 A | | 4/1995 | Dodds et al. |
| 5,580,837 A | * | 12/1996 | Dodds et al. ............... 501/152 |
| 5,589,009 A | * | 12/1996 | Kim et al. ................. 148/302 |
| 5,674,327 A | * | 10/1997 | Yamamoto et al. ......... 148/302 |
| 5,908,513 A | * | 6/1999 | Sasaki et al. ............... 148/302 |

FOREIGN PATENT DOCUMENTS

| | | | |
|---|---|---|---|
| CA | 1122839 | * | 5/1996 |
| CN | 1122839 A | | 5/1996 |
| EP | 0309091 A2 | | 3/1989 |
| EP | 1118601 A1 | | 7/2001 |
| JP | 55-121966 | * | 9/1980 |
| JP | 1-264963 A | | 10/1989 |
| JP | 3-115535 | * | 5/1991 |
| JP | 8-40770 | * | 2/1996 |

* cited by examiner

*Primary Examiner*—Karl Group
(74) *Attorney, Agent, or Firm*—Birch, Stewart, Kolasch & Birch, LLP

(57) ABSTRACT

A crucible comprising $Al_2O_3$ and at least one selected from rare earth oxides inclusive of $Y_2O_3$ as main components and characterized by firing at 500–1,800° C., the distribution of the rare earth oxide at a higher proportion in a fine particle portion having a particle size of up to 0.5 mm than in a coarse particle portion having a particle size in excess of 0.5 mm, and the substantial absence of the reaction product of the rare earth oxide with $Al_2O_3$ is suitable for the melting of a rare earth alloy.

3 Claims, 3 Drawing Sheets

CRUCIBLE FOR MELTING RARE EARTH ELEMENT ALLOY AND RARE EARTH ELEMENT ALLOY

TECHNICAL FIELD

This invention relates to a crucible for use in the high-frequency melting of rare earth alloys, and rare earth alloys obtained using the crucible.

BACKGROUND ART

Rare earth alloys are recently used in a variety of fields as magnet material, battery electrode material and the like. It is important to manufacture rare earth alloys of consistent quality at a low cost.

In general, the rare earth alloys are produced by weighing amounts of raw materials so as to give a desired composition, placing them in a crucible, high-frequency melting, and feeding the melt into a mold or rotating rolls for casting.

The crucible used for high-frequency melting can be manufactured by a conventional process, as used in the ceramic preparation, involving mixing predetermined raw materials with water or a binder and water to form a slurry, and shaping the slurry, followed by removal from the mold and firing (or drying). Since the molten rare earth alloy is extraordinarily reactive, the crucible used for melting of the crucible material must meet the following requirements.

Namely, the crucible material must have (1) least reactivity with water and (2) a certain degree of stability. On the other hand, the crucible is given requirements including (1) resistance to cracking by thermal expansion upon high-frequency heating (resistance to thermal shocks), (2) high mechanical strength, (3) easy removal of the slag which deposits within the crucible at the end of melting, and (4) low cost.

To meet these requirements, the crucibles used in the melting of rare earth alloys have been constructed of $Al_2O_3$ or $Al_2O_3$ with additives.

$Al_2O_3$ used herein has a stability which is relatively high among oxides, but inferior to rare earth metals, allowing reaction to proceed little by little. The reacted portion becomes a slag. The slag, which is strongly bound to the crucible and difficult to remove, gives rise to some problems that the slag removal operation takes a long time to detract from productivity and that the crucible can be damaged during the slag removal operation.

These problems may be solved by using rare earth oxides and calcium oxide which are highly stable and least reactive with rare earth metals. Because of their likelihood to form hydroxides, they can be used as unshaped refractory or added only in small amounts, but are difficult to use as the primary material of shaped refractory to construct the crucible.

DISCLOSURE OF THE INVENTION

Therefore, an object of the invention is to provide a rare earth alloy melting crucible which allows any slag generating thereon to be readily removed, can be used repeatedly, and is inexpensive; and a rare earth alloy obtained using the crucible.

Analyzing the reaction of a conventional crucible made of $Al_2O_3$ with an Nd—Fe—B base alloy typical of rare earth alloys and a slag thereof, the inventors found the following problems.

More particularly, since the particle size formulation of the crucible is important in order that the crucible be unsusceptible to cracking by thermal expansion upon high-frequency heating (or be improved in strength to thermal shocks), the particle size distribution is adjusted in accordance with the purpose or the size of the crucible. $Al_2O_3$ particles having a particle size of up to 2 mm, especially up to 0.5 mm preferentially undergo reaction with Nd or rare earth metal as shown by the equation:

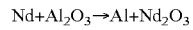

$$Nd+Al_2O_3 \rightarrow Al+Nd_2O_3$$

which reaction proceeds progressively; whereas $Al_2O_3$ particles having a particle size of more than 2 mm undergo reaction to a depth of 10 to 100 μm from their surface, but the reaction does not proceed further as if the particles were protected by the reacted film. This difference arises presumably because finer powder becomes more active.

The progress of such reaction results in a state as shown in FIG. 2. When the reaction reaches the interior of a crucible 1 composed of coarse particle portions 10 and fine particle portions 11, the region of the crucible that has reacted forms a slag 1A which is strongly bound to the crucible 1. When melting of a subsequent batch is carried out in this crucible with the slag 1A left intact, the reaction proceeds further and the internal volume of the crucible varies. It is then basically required to remove the slag 1A every batch or periodically. Since the slag 1A is strongly bound to the crucible 1, removal operation is difficult and can damage the crucible 1 during the procedure.

Then making studies from several aspects, the inventors have found that the life of the crucible can be increased by introducing a rare earth oxide into portions with a particle size of up to 0.5 mm at a high concentration to prevent the crucible material from reacting with a rare earth alloy, whereby the slag if generated can be readily removed.

On the other hand, since melting of a rare earth alloy is carried out batchwise, thermal cycles of heating from room temperature to a melting temperature (1,000 to 1,700° C.) and then cooling are repeated. The crucible is then subjected to repeated cycles of thermal expansion and contraction. This can cause the crucible to be cracked, resulting in further promoted degradation.

Referring to FIG. 3, the phenomenon is described. The above-described thermal cycles cause the crucible 1 composed of coarse particle portions 10 and fine particle portions 11 to crack at 1B. As a result, reaction reaches the interior of the crucible 1, and the reacted region forms a slag 1A which is strongly bound to the crucible 1. When melting of a subsequent batch is carried out in this crucible with the slag 1A left intact, the reaction proceeds further and the internal volume of the crucible 1 varies. It is then basically required to remove the slag 1A every batch or periodically. However, since the slag 1A is strongly bound to the crucible 1, removal operation is difficult and can damage the crucible 1 during the procedure. In this connection, it has been found that generation of cracks on thermal cycles can be prevented by using $Al_2TiO_5$ having a low coefficient of thermal expansion as a main component, and that the life of the crucible can be increased by introducing a rare earth oxide into portions with a particle size of up to 0.5 mm at a high concentration to prevent the crucible material from reacting with a rare earth alloy, whereby the slag if generated can be readily removed. The present invention is predicated on these findings.

Specifically, the present invention provides:

(1) a crucible for the melting of a rare earth alloy, comprising $Al_2O_3$ and at least one selected from rare earth oxides inclusive of $Y_2O_3$ as main components, characterized in that the crucible is obtained by firing at 500 to 1,800° C., the rare earth oxide is distributed at a higher proportion in a portion of fine particles having a particle size of up to 0.5 mm than in a portion of coarse particles having a particle size in excess of 0.5 mm, and the crucible is substantially free of the reaction product of the rare earth oxide with $Al_2O_3$;

(2) a crucible for the melting of a rare earth alloy according to (1), characterized in that 2 to 100% by volume of the fine particle portion is the rare earth oxide and 20 to 100% by volume of the coarse particle portion is $Al_2O_3$; and (3) a rare earth alloy obtained using a crucible according to (1) or (2).

Also, the present invention provides:

(4) a crucible for the melting of a rare earth alloy, comprising $Al_2TiO_5$ and at least one selected from rare earth oxides inclusive of $Y_2O_3$ as main components, characterized in that the crucible is obtained by firing at 1,000 to 1,700° C., the rare earth oxide is distributed at a higher proportion in a portion of fine particles having a particle size of up to 0.5 mm than in a portion of coarse particles having a particle size in excess of 0.5 mm, and the crucible is substantially free of the reaction product of the rare earth oxide with $Al_2TiO_5$;

(5) a crucible for the melting of a rare earth alloy, comprising $Al_2O_3$, $Al_2TiO_5$ and at least one selected from rare earth oxides inclusive of $Y_2O_3$ as main components, characterized in that the crucible is obtained by firing at 1,000 to 1,700° C., the rare earth oxide is distributed at a higher proportion in a portion of fine particles having a particle size of up to 0.5 mm than in a portion of coarse particles having a particle size in excess of 0.5 mm, and the crucible is substantially free of the reaction products of the rare earth oxide with $Al_2O_3$ and $Al_2TiO_5$;

(6) a crucible for the melting of a rare earth alloy according to (4) or (5), characterized in that 2 to 100% by volume of the fine particle portion is the rare earth oxide;

(7) a crucible for the melting of a rare earth alloy according to (4), (5) or (6), characterized in that the at least one rare earth oxide is $Y_2O_3$; and (8) a rare earth alloy obtained using a crucible according to any one of (4) to (7).

BEST MODE FOR CARRYING OUT THE INVENTION

Figure 1:
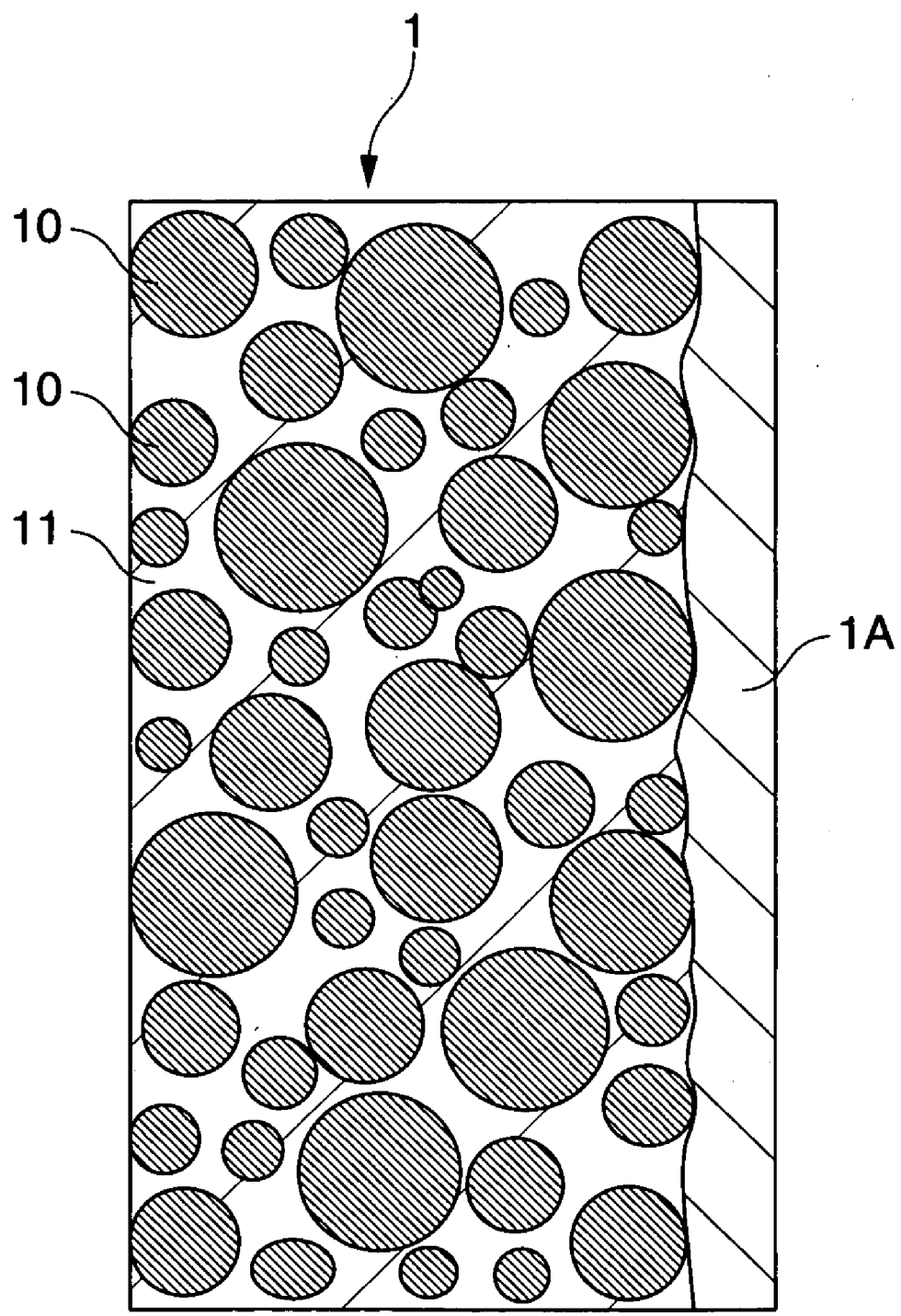
FIG. 1 is a fragmental cross-sectional view of a crucible according to the invention in which a slag has generated.
Figure 2:
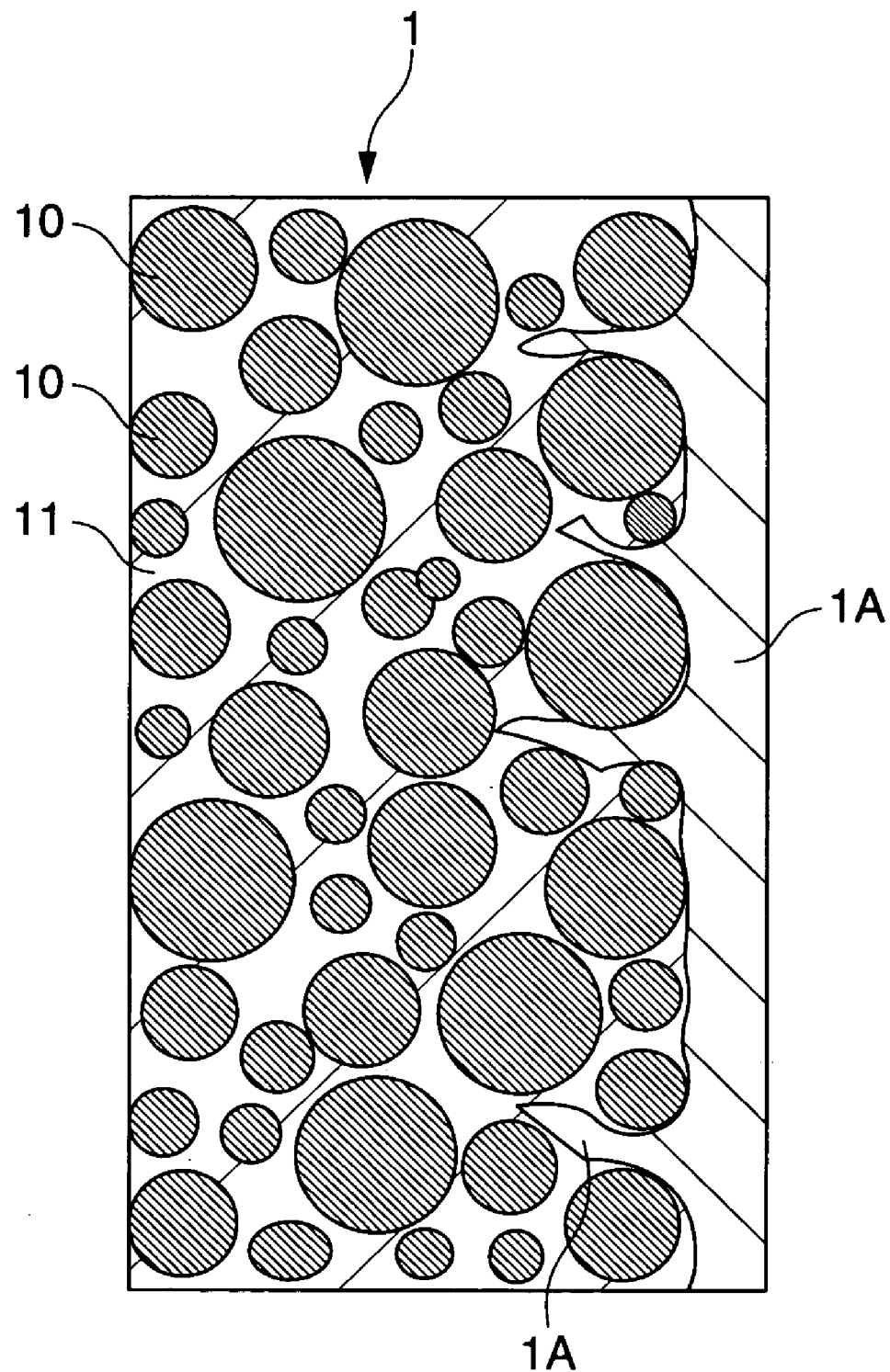
FIG. 2 is a fragmental cross-sectional view of a conventional crucible in which a slag has generated.
Figure 3:
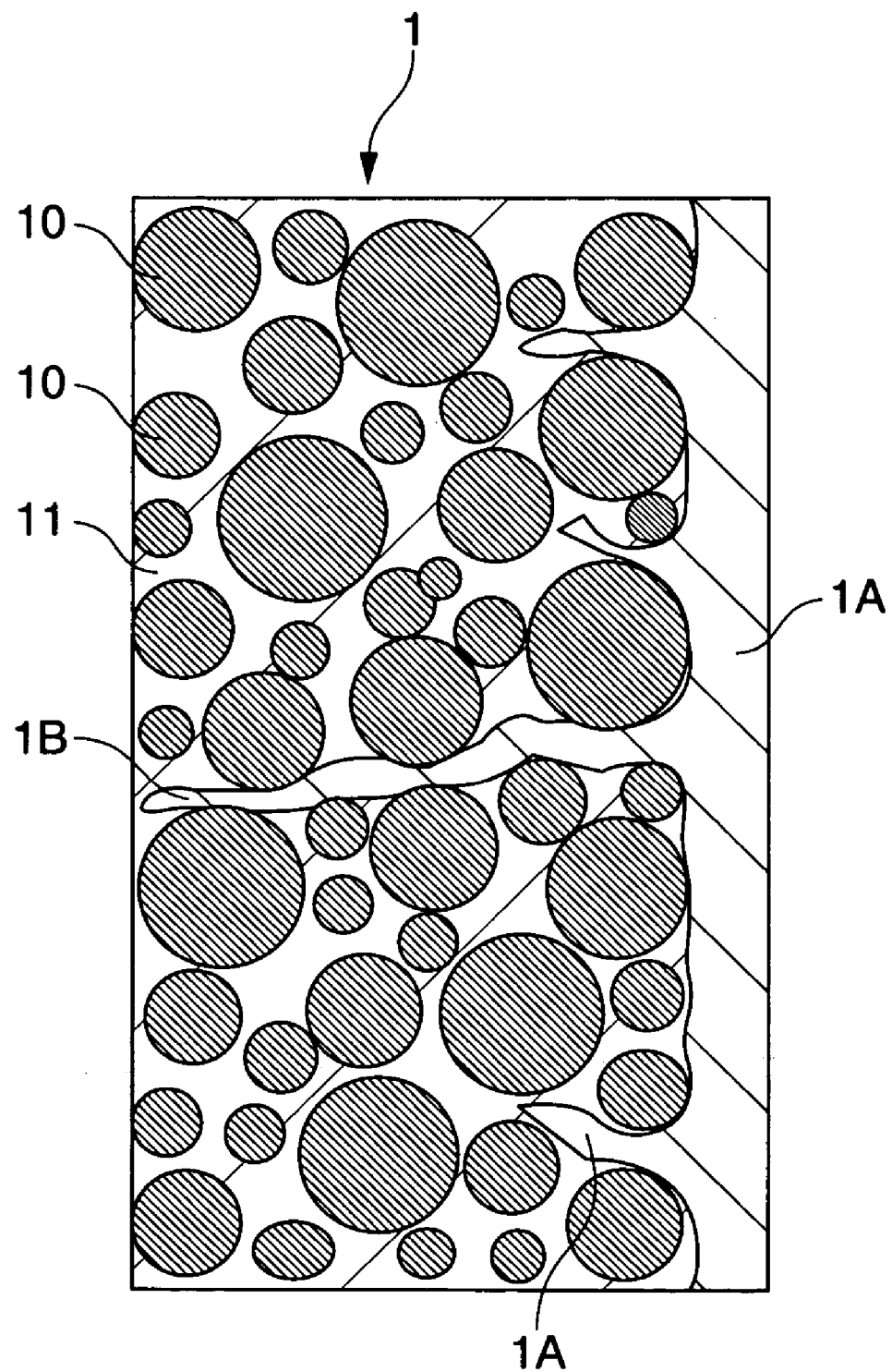
FIG. 3 is a fragmental cross-sectional view of another conventional crucible in which a slag has generated.

A rare earth alloy melting crucible according to a first embodiment of the invention is one comprising $Al_2O_3$ and one or more oxides selected from rare earth oxides inclusive of $Y_2O_3$ as main components, characterized in that the crucible is obtained by firing at 500 to 1,800° C., the rare earth oxide is distributed at a higher proportion in a portion of fine particles having a particle size of up to 0.5 mm than in a portion of coarse particles having a particle size in excess of 0.5 mm, and the crucible is substantially free of the reaction product of the rare earth oxide with $Al_2O_3$.

The rare earth oxide which may be used is one or more oxides selected from oxides of rare earth elements including yttrium (Y) and ranging from La to Lu. Of these, $Y_2O_3$, $CeO_2$, $Dy_2O_3$, $Tb_4O_7$ and $Sm_2O_3$ having a lower degree of hydroxide formation are preferred for use.

The rare earth oxide is distributed in the fine particle portion with a particle size of up to 0.5 mm in a high proportion in order to restrain reaction of the crucible with a rare earth alloy. Specifically, it is preferred that at least 50% by volume, especially at least 60% by volume of the rare earth oxides in the entire crucible be present in the fine particle portion.

Also preferably, the content of rare earth oxide in the fine particle portion is 2 to 100% by volume, and especially 10 to 100% by volume.

In this portion, the balance may be one of ceramics such as $Al_2O_3$, $SiO_2$, $TiO_2$, $ZrO_2$, MgO, CaO, $Si_3N_4$, BN and $TiB_2$ or a combination thereof.

On the other hand, since the coarse particle portion having a particle size in excess of 0.5 mm is relatively less reactive, it is possible to use $Al_2O_3$ having a good balance of mechanical strength, stability and cost. The content of $Al_2O_3$ is 20 to 100% by volume, and especially 50 to 100% by volume of the coarse particle portion.

In this portion, the balance may be one of rare earth oxides such as $Y_2O_3$, $CeO_2$, $Dy_2O_3$, $Tb_4O_7$ and $Sm_2O_3$ and ceramics such as $SiO_2$, $TiO_2$, $ZrO_2$, MgO, CaO, $Si_3N_4$, BN and $TiB_2$, or a combination thereof. The addition amount thereof is preferably 50% by volume or less. When the rare earth oxide is used in the coarse particle portion, it must be included such that it is richer in the fine particle portion than in the coarse particle portion.

It is noted that the size of coarse particles is preferably up to 10 mm, and especially up to 5 mm.

A rare earth alloy melting crucible according to a second embodiment of the invention is one comprising $Al_2TiO_5$ and at least one selected from rare earth oxides inclusive of $Y_2O_3$ as main components, characterized in that the crucible is obtained by firing at 1,000 to 1,700° C., the rare earth oxide is distributed at a higher proportion in a portion of fine particles having a particle size of up to 0.5 mm than in a portion of coarse particles having a particle size in excess of 0.5 mm, and the crucible is substantially free of the reaction product of the rare earth oxide with $Al_2TiO_5$; and a rare earth alloy melting crucible according to a third embodiment of the invention is one comprising $Al_2O_3$, $Al_2TiO_5$ and at least one selected from rare earth oxides inclusive of $Y_2O_3$ as main components, characterized in that the crucible is obtained by firing at 1,000 to 1,700° C., the rare earth oxide is distributed at a higher proportion in a portion of fine particles having a particle size of up to 0.5 mm than in a portion of coarse particles having a particle size in excess of 0.5 mm, and the crucible is substantially free of the reaction products of the rare earth oxide with $Al_2O_3$ and $Al_2TiO_5$.

The rare earth oxide which may be used is one or more oxides selected from oxides of rare earth elements including yttrium (Y) and ranging from La to Lu, as in the first embodiment. Of these, $Y_2O_3$, $CeO_2$, $Dy_2O_3$, $Tb_4O_7$ and $Sm_2O_3$ having a lower degree of hydroxide formation are preferred for use. Inter alia, $Y_2O_3$ having excellent stability is most preferred for use.

The rare earth oxide is distributed in the fine particle portion with a particle size of up to 0.5 mm in a high proportion in order to restrain reaction of the crucible with a rare earth alloy. Specifically, it is preferred that at least 50% by volume, especially at least 60% by volume of the rare earth oxides in the entire crucible be present in the fine particle portion.

Also preferably, the content of rare earth oxide in the fine particle portion is 2 to 100% by volume, and especially 10 to 100% by volume.

In this portion, the balance is preferably $Al_2TiO_5$, although it is acceptable from the standpoints of mechanical strength and the like to add one of ceramics such as $Al_2OB_2$, $SiO_2$, $TiO_2$, $ZrO_2$, MgO, CaO, $Si_3N_4$, BN and $TiB_2$ or a combination thereof in an amount of up to 50% by volume.

On the other hand, $Al_2TiO_5$ becomes the main component of the coarse particle portion having a particle size in excess of 0.5 mm, and preferably up to 5 mm.

Herein, part of $Al_2TiO_5$ may be replaced by $Al_2O_3$ which is commonly used as the raw material of the crucible, although a mixture with a higher proportion of $Al_2TiO_5$ is preferred as long as mechanical strength is ensured for the crucible.

When part of $Al_2TiO_5$ is replaced by $Al_2O_3$, the replacement proportion is preferably up to 80% by volume and especially up to 30% by volume.

It is noted that to the coarse particle portion, one or a mixture of the above-mentioned rare earth oxides and ceramics such as $SiO_2$, $TiO_2$, $ZrO_2$, MgO, CaO, $Si_3N_4$, BN and $TiB_2$, may be added in a proportion of up to 50% by volume. When the rare earth oxide is used in the coarse particle portion, it must be included such that it is richer in the fine particle portion than in the coarse particle portion, as previously described.

In the practice of the invention, the mixing proportion of fine particles and coarse particles varies with the size of the crucible or the like, and is preferably such that the fine particle portion is 10 to 60% by volume, and especially 20 to 40% by volume. If the fine particle portion is less than 10% by volume, strength lowers with a high probability. If the fine particle portion is more than 60% by volume, a possibility of failure by thermal shocks increases.

The crucible of the invention is produced, for example, by the following procedure.

Rare earth oxide and $Al_2O_3$ and/or $Al_2TiO_5$ are placed on a sieve having openings of a predetermined diameter (e.g., 5 mm or 0.5 mm), and classified into a fine particle portion having a particle size of up to 0.5 mm and a coarse particle portion (e.g., with a particle size of 0.5 to 5 mm). The rare earth oxide is used for the fine particle portion, and $Al_2O_3$ and/or $Al_2TiO_5$ is used for the coarse particle portion.

The fine particle portion and the coarse particle portion are mixed so that the fine particle portion accounts for 10 to 60% by volume. A slurry of the mixture is filled in a predetermined mold where it is fired in an air atmosphere, vacuum atmosphere or inert gas atmosphere of Ar or the like, at 500 to 1,800° C., preferably 1,000 to 1,700° C., obtaining a crucible.

If firing is effected at temperatures higher than 1,800° C., reaction can occur between the rare earth oxide and $Al_2O_3$ and/or $Al_2TiO_5$, and some areas are densified at the same time, with an increased possibility of becoming brittle to thermal shocks. Additionally, the crucible deforms due to the difference in shrinkage factor between reacted areas and unreacted regions, with the enhanced propensity of the crucible becoming unusable. On the other hand, heating at temperatures below 500° C. leads to under-firing, failing to achieve the desired strength.

Namely, by firing the crucible material in the above-defined temperature range, a crucible substantially free of the reaction products of the rare earth oxide with $Al_2O_3$ and/or $Al_2TiO_5$ (and/or $Al_2O_3$) is obtainable.

As described above, the crucible for use in the melting of a rare earth alloy according to the invention uses $Al_2O_3$ and/or $Al_2TiO_5$ which is a material having a low coefficient of thermal expansion, for preventing cracks from generating upon thermal cycling, and has the rare earth oxide contained at a higher proportion in the fine particle portion with a particle size of up to 0.5 mm, for restraining the reaction of the crucible with the rare earth alloy from proceeding.

Accordingly, as shown in FIG. 1, the reaction does not reach the interior of a crucible 1 composed of coarse particle portions 10 and fine particle portions 11, with a slag 1A being weakly bound to the crucible 1. Then the slag 1A can be readily removed, and any damage to the crucible 1 during slag removal operation is avoided.

An additional advantage of an increased product yield arises from the reduced amount of slag, that is, the suppressed reaction of the crucible with the rare earth alloy.

Also contemplated herein is a rare earth alloy which is prepared using the inventive crucible described above.

The rare earth alloy is not critical as long as it contains one or more rare earth elements selected from among Y and La through Lu. Exemplary alloys are Nd—Fe—B base alloys and Sm—Co base alloys.

Such rare earth alloy can be prepared by blending raw materials so as to provide a predetermined composition, placing the blend in the inventive crucible, effecting high-frequency melting in an inert gas atmosphere such as Ar at 500 to 1,800° C., preferably 1,000 to 1,700° C., and pouring the resulting melt into a mold, followed by cooling.

It is noted that the temperature used in high-frequency melting is preferably controlled within the above range in order to prevent any reaction with the rare earth oxide, $Al_2TiO_5$ and other components of the crucible.

EXAMPLE

Examples and Comparative Examples are given below by way of illustration although the invention is not limited to these Examples.

Example 1

$CeO_2$ and $Al_2O_3$ were passed through two sieves of 5 mm and 0.5 mm and classified into a fine particle portion having a particle size of up to 0.5 mm and a coarse particle portion having a particle size of 0.5 to 5 mm. $CeO_2$ was assigned to the fine particle portion, and $Al_2O_3$ was assigned to the coarse particle portion.

They were mixed in a proportion of 30% by volume the fine particle portion and 70% by volume the coarse particle portion. A slurry of the mixture was prepared and poured in a gypsum mold where it was allowed to stand over 2 days. By subsequent removal from the mold, holding for a further 2 days and firing 1,550° C., a crucible was obtained. The crucible had an outer diameter of 540 mm, a height of 840 mm, a thickness of 40 mm and a weight of 229 kg.

In this crucible was placed 500 kg of a raw material for Nd—Fe—B base magnet which had been weighed so as to give the compositional formula: 30.5 Nd-1.2 Dy-1.0 B-2.0 Co-0.2 Al-65.1 Fe (in % by weight). After melting in an Ar atmosphere by high-frequency heating at 1,500° C. for 70 minutes, the melt was cast into a mold.

The crucible was allowed to stand for 80 minutes for cooling and then opened to air, followed by slag removal operation. Thereafter, the raw material was placed therein and melted again. In this way, the process was repeated until the crucible became unusable. The crucible failed during the slag removal operation at the end of 58th melting cycle. The products of these 58 cycles were in an average yield of 98.7%, and the average time taken for slag removal was 13 minutes.

Example 2

A crucible was prepared as in Example 1 except that a mixture consisting of 50% by volume of $CeO_2$, 30% by volume of $Al_2O_3$ and 20% by volume of $SiO_2$ was prepared and used for the fine particle portion with a particle size of up to 0.5 mm, and a mixture consisting of 10% by volume of $CeO_2$ and 90% by volume of $Al_2O_3$ was prepared and used for the coarse particle portion with a particle size in excess of 0.5 mm.

Using this crucible, a rare earth alloy was melted as in Example 1. The crucible failed during the slag removal operation at the end of 54th melting cycle. The products of these 54 cycles were in an average yield of 98.5%, and the average time taken for slag removal was 15 minutes.

Example 3

A crucible was prepared as in Example 1 except that a mixture consisting of 80% by volume of $CeO_2$ and 20% by volume of $Y_2O_3$ was prepared and used for the fine particle portion with a particle size of up to 0.5 mm, and a mixture consisting of 70% by volume of $Al_2O_3$ and 30% by volume of $SiO_2$ was prepared and used for the coarse particle portion with a particle size in excess of 0.5 mm.

Using this crucible, a rare earth alloy was melted as in Example 1. The crucible failed during the slag removal operation at the end of 68th melting cycle. The products of these 68 cycles were in an average yield of 98.9%, and the average time taken for slag removal was 10 minutes.

Example 4

A crucible was prepared as in Example 1 except that $Y_2O_3$ was used for the fine particle portion with a particle size of up to 0.5 mm.

Using this crucible, a rare earth alloy was melted as in Example 1. The crucible failed during the slag removal operation at the end of 75th melting cycle. The products of these 75 cycles were in an average yield of 99.0%, and the average time taken for slag removal was 9 minutes.

Example 5

A crucible was prepared as in Example 1 except that a mixture consisting of 50% by volume of $Y_2O_3$, 30% by volume of $Al_2O_3$ and 20% by volume of $SiO_2$ was prepared and used for the fine particle portion with a particle size of up to 0.5 mm, and a mixture consisting of 10% by volume of $Y_2O_3$ and 90% by volume of $Al_2O_3$ was prepared and used for the coarse particle portion with a particle size in excess of 0.5 mm.

Using this crucible, a rare earth alloy was melted as in Example 1. The crucible failed during the slag removal operation at the end of 65th melting cycle. The products of these 65 cycles were in an average yield of 98.8%, and the average time taken for slag removal was 11 minutes.

Example 6

A crucible was prepared as in Example 1 except that a mixture consisting of 90% by volume of $Y_2O_3$ and 10% by volume of $Dy_2O_3$ was prepared and used for the fine particle port-ion with a particle size of up to 0.5 mm, and a mixture consisting of 70% by volume of $Al_2O_3$ and 30% by volume of $SiO_2$ was prepared and used for the coarse particle portion with a particle size in excess of 0.5 mm.

Using this crucible, a rare earth alloy was melted as in Example 1. The crucible failed during the slag removal operation at the end of 72nd melting cycle. The products of these 72 cycles were in an average yield of 98.8%, and the average time taken for slag removal was 10 minutes.

Comparative Example 1

A crucible was prepared as in Example 1 except that $Al_2O_3$ was used for both the fine particle portion with a particle size of up to 0.5 mm and the coarse particle portion with a particle size in excess of 0.5 mm.

Using this crucible, a rare earth alloy was melted as in Example 1. The crucible failed during the slag removal operation at the end of 36th melting cycle. The products of these 36 cycles were in an average yield of 98.0%, and the average time taken for slag removal was 33 minutes.

Comparative Example 2

A crucible was prepared as in Example 1 except that a mixture consisting of 80% by volume of $Al_2O_3$ and 20% by volume of $SiO_2$ was prepared and used for the fine particle portion with a particle size of up to 0.5 mm, and a mixture consisting of 10% by volume of $CeO_2$ and 90% by volume of $Al_2O_3$ was prepared and used for the coarse particle portion with a particle size in excess of 0.5 mm.

Using this crucible, a rare earth alloy was melted as in Example 1. The crucible failed during the slag removal operation at the end of 33rd melting cycle. The products of these 33 cycles were in an average yield of 97.9%, and the average time taken for slag removal was 36 minutes.

Comparative Example 3

A crucible was prepared as in Example 1 except that a mixture consisting of 80% by volume of $Al_2O_3$ and 20% by volume of $SiO_2$ was prepared and used for the fine particle portion with a particle size of up to 0.5 mm, and a mixture consisting of 10% by volume of $Y_2O_3$ and 90% by volume of $Al_2O_3$ was prepared and used for the coarse particle portion with a particle size in excess of 0.5 mm.

Using this crucible, a rare earth alloy was melted as in Example 1. The crucible failed during the slag removal operation at the end of 37th melting cycle. The products of these 37 cycles were in an average yield of 98.1%, and the average time taken for slag removal was 29 minutes.

Comparative Example 4

A crucible was prepared as in Example 1 except that a mixture consisting of 99;% by volume of $Al_2O_3$ and 1% by volume of $Y_2O_3$ was prepared and used for the fine particle portion with a particle size of up to 0.5 mm, and a mixture consisting of 70% by volume of $Al_2O_3$ and 30% by volume of $SiO_2$ was prepared and used for the coarse particle portion with a particle size in excess of 0.5 mm.

Using this crucible, a rare earth alloy was melted as in Example 1. The crucible failed during the slag removal operation at the end of 41st melting cycle. The products of these 41 cycles were in an average yield of 97.9%, and the average time taken for slag removal was 30 minutes.

TABLE 1

| | Fine particle portion (vol %) | | | | | Coarse particle portion (vol %) | | | | Use cycles | Yield (%) | Slag removal time (min) |
|---|---|---|---|---|---|---|---|---|---|---|---|---|
| | $CeO_2$ | $Y_2O_3$ | $Dy_2O_3$ | $Al_2O_3$ | $SiO_2$ | $CeO_2$ | $Y_2O_3$ | $Al_2O_3$ | $SiO_2$ | | | |
| Example 1 | 100 | — | — | — | — | — | — | 100 | — | 58 | 98.7 | 13 |
| Example 2 | 50 | — | — | 30 | 20 | 10 | — | 90 | — | 54 | 98.5 | 15 |
| Example 3 | 80 | 20 | — | — | — | — | — | 70 | 30 | 68 | 98.9 | 10 |
| Example 4 | — | 100 | — | — | — | — | — | 100 | — | 75 | 99.0 | 9 |
| Example 5 | — | 50 | — | 30 | 20 | — | 10 | 90 | — | 65 | 98.9 | 11 |
| Example 6 | — | 90 | 10 | — | — | — | — | 70 | 30 | 72 | 98.8 | 10 |
| Comparative Example 1 | — | — | — | 100 | — | — | — | 100 | — | 36 | 98.0 | 33 |
| Comparative Example 2 | — | — | — | 80 | 20 | 10 | — | 90 | — | 33 | 97.9 | 36 |
| Comparative Example 3 | — | — | — | 80 | 20 | — | 10 | 90 | — | 37 | 98.1 | 29 |
| Comparative Example 4 | — | 1 | — | 99 | — | — | — | 70 | 30 | 41 | 97.9 | 30 |

As shown in Table 1, a comparison of Examples 1–6 with Comparative Examples 1–4 reveals that Examples containing rare earth oxide at a higher proportion in the portion having a particle size of up to 0.5 mm succeed in significantly increasing the use cycles of the crucible and are easy to remove slag and improved in product yield.

Example 7

$Y_2O_3$ and $Al_2TiO_5$ were passed through sieves of 5 mm and 0.5 mm and classified into a fine particle portion having a particle size of up to 0.5 mm and a coarse particle portion having a particle size of 0.5 to 5 mm. $Y_2O_3$ was assigned to the fine particle portion, and $Al_2TIO_5$ was assigned to the coarse particle portion.

They were mixed in a proportion of 50% by volume the fine particle portion and 50% by volume the coarse particle portion. A slurry of the mixture was prepared and poured in a gypsum mold where it was allowed to stand over 2 days. By subsequent removal from the mold, holding for a further 2 days and firing 1,550° C., a crucible was obtained. The crucible had an outer diameter of 540 mm, a height of 840 mm, a thickness of 40 mm and a weight of 218 kg.

In this crucible was placed 500 kg of a raw material for Nd—Fe—B base magnet which had been weighed so as to give the compositional formula: 30.5 Nd-1.2 Dy-1.0 B-2.0 Co-0.2 Al-65.1 Fe (in % by weight). After melting in an Ar atmosphere by high-frequency heating at 1,500° C. for 70 minutes, the melt was cast into a mold.

The crucible was allowed to stand for 80 minutes for cooling and then opened to air, followed by slag removal operation. Thereafter, the raw material was placed therein and melted again. In this way, the process was repeated until the crucible became unusable.

The crucible failed during the slag removal operation at the end of 172nd melting cycle. The products of these 172 cycles were in an average yield of 99.1%, and the average time taken for slag removal was 7 minutes.

Example 8

A crucible was prepared as in Example 7 except that a mixture consisting of 50% by volume of $Y_2O_3$, 30% by volume of $Al_2TiO_5$ and 20% by volume of $SiO_2$ was prepared and used for the fine particle portion with a particle size of up to 0.5 mm, and a mixture consisting of 10% by volume of $Y_2O_3$ and 90% by volume of $Al_2TiO_5$ was prepared and used for the coarse particle portion with a particle size in excess of 0.5 mm.

Using this crucible, a rare earth alloy was melted as in Example 7. The crucible failed during the slag removal operation at the end of 188th melting cycle. The products of these 188 cycles were in an average yield of 98.9%, and the average time taken for slag removal was 9 minutes.

Example 9

A crucible was prepared as in Example 7 except that a mixture consisting of 30% by volume of $Y_2O_3$, 30% by volume of $Al_2TiO_5$, 10% by volume of $Al_2O_3$ and 30% by volume of $SiO_2$ was prepared and used for the fine particle portion with a particle size of up to 0.5 mm, and a mixture consisting of 70% by volume of $Al_2TiO_5$, 20% by volume of $Al_2O_3$ and 10% by volume of $SiO_2$ was prepared and used for the coarse particle portion with a particle size in excess of 0.5 mm.

Using this crucible, a rare earth alloy was melted as in Example 7. The crucible failed during the slag removal operation at the end of 196th melting cycle. The products of these 196 cycles were in an average yield of 98.8%, and the average time taken for slag removal was 11 minutes.

Comparative Example 5

A crucible was prepared as in Example 7 except that $Al_2O_3$ was used for both the fine particle portion with a particle size of up to 0.5 mm and the coarse particle portion with a particle size in excess of 0.5 mm.

Using this crucible, a rare earth alloy was melted as in Example 7. The crucible failed during the slag removal operation at the end of 36th melting cycle. The products of these 36 cycles were in an average yield of 98.0%, and the average time taken for slag removal was 33 minutes.

Comparative Example 6

A crucible was prepared as in Example 7 except that $Al_2O_3$ was used for the fine particle portion with a particle size of up to 0.5 mm and $Al_2TiO_5$ was used for the coarse particle portion with a particle size in excess of 0.5 mm.

Using this crucible, a rare earth alloy was melted as in Example 7. The crucible failed during the slag removal operation at the end of 51st melting cycle. The products of these 51 cycles were in an average yield of 98.2%, and the average time taken for slag removal was 24 minutes.

The results of the foregoing Examples and Comparative Examples are shown in Table 2.

TABLE 2

| | Fine particle portion (vol %) | | | | Coarse particle portion (vol %) | | | | Use cycles | Yield (%) | Slag removal time (min) |
|---|---|---|---|---|---|---|---|---|---|---|---|
| | $Y_2O_3$ | $Al_2TiO_5$ | $Al_2O_3$ | $SiO_2$ | $Y_2O_3$ | $Al_2TiO_5$ | $Al_2O3$ | $SiO_2$ | | | |
| Example 7 | 100 | — | — | — | — | 100 | — | — | 172 | 99.1 | 7 |
| Example 8 | 50 | 30 | — | 20 | 10 | 90 | — | — | 188 | 98.9 | 9 |
| Example 9 | 30 | 30 | 10 | 30 | — | 70 | 20 | 10 | 196 | 98.8 | 11 |
| Comparative Example 5 | — | — | 100 | — | — | — | 100 | — | 36 | 98.0 | 33 |
| Comparative Example 6 | — | — | 100 | — | — | 100 | — | — | 51 | 98.2 | 24 |

As shown in Table 2, a comparison of Examples 7–9 with Comparative Examples 5–6 reveals that Examples containing rare earth oxide at a higher proportion in the portion having a particle size of up to 0.5 mm succeed in significantly increasing the use cycles of the crucible and are easy to remove slag and improved in product yield.

A comparison of Example 7 with Example 4 reveals that the life of the crucible is significantly prolonged using $Al_2TiO_5$.

When $Al_2O_3$ or $SiO_2$ is added in order to increase the strength of the crucible as in Examples 8 and 9, the use cycles are further increased despite some drops in product yield and slag removal time as compared with Example 7.

As described above, the present invention is successful in extending the lifetime of the crucible, reducing the slag removal time, increasing the throughput of products, reducing the labor cost, and achieving an increase in product yield.

The invention claimed is:

1. A crucible for the melting of a rare earth alloy, comprising $Al_2O_3$, $Al_2TiO_5$ and at least one selected from rare earth oxides inclusive of $Y_2O_3$ as main components, wherein the crucible is obtained by firing at 1,000 to 1,700° C., the rare earth oxide is distributed at a higher proportion in a fine particle portion consisting of fine particles having a particle size of up to 0.5 mm than in a coarse particle portion consisting of coarse particles having a particle size in excess of 0.5 mm, and the crucible is substantially free of reaction product of the rare earth oxide with $Al_2O_3$ and $Al_2TiO_5$.

2. The crucible for the melting of a rare earth alloy according to claim 1, wherein 2 to 100% by volume of the fine particle portion is the rare earth oxide.

3. The crucible for the melting of a rare earth alloy according to claim 1, wherein the at least one rare earth oxide is $Y_2O_3$.

* * * * *